A. F. POOLE.
ELECTRIC CLOCK SYSTEM.
APPLICATION FILED SEPT. 10, 1917.

1,328,247.

Patented Jan. 13, 1920.
2 SHEETS—SHEET 1.

A. F. POOLE.
ELECTRIC CLOCK SYSTEM.
APPLICATION FILED SEPT. 10, 1917.

1,328,247.

Patented Jan. 13, 1920.
2 SHEETS—SHEET 2.

Inventor:
Arthur F. Poole.

UNITED STATES PATENT OFFICE.

ARTHUR F. POOLE, OF CHICAGO, ILLINOIS.

ELECTRIC-CLOCK SYSTEM.

1,328,247.  Specification of Letters Patent.  Patented Jan. 13, 1920.

Application filed September 10, 1917. Serial No. 190,587.

*To all whom it may concern:*

Be it known that I, ARTHUR F. POOLE, a citizen of the United States, residing at Chicago, in the county of Cook and State of Illinois, have invented certain new and useful Improvements in Electric - Clock Systems, of which the following is a specification.

My invention is an electric clock system and is a further development of the system disclosed by me in a certain co-pending application. In said application is shown a central station at which there is a generator of alternating current. Said generator is synchronized with a master clock so that it will send out exactly sixty cycles per second in the long run, this synchronism being obtained either automatically or manually. The secondary clocks consist of synchronous motors which are properly geared to clock hands, and these clocks may be attached at any place on the supply lines and will keep in step with the current sent from the central station, consequently keeping correct time.

The object of my present invention is to improve the above described system in certain of its details, particularly at the central station, in the provision of improved means for determining the error of the generator as compared to the master clock, and further, at the subscriber's station, to improve the construction of the secondary clocks, to the end that in case of an accidental interruption of current the secondary clocks may continue to run without interruption in spite of the fact that the current supply is temporarily cut off.

A further object of my invention is the provision in the above described system of an improved secondary clock which contains a continuously moving element and an element moving in synchronism with the source of current supply. Automatic means are provided to regulate the rate of rotation of said continuously moving element with the rotation of the synchronously moving element, to the end that the rate of rotation of these two elements may be the same. Then it is obvious that in case the source of current supply is cut off, thus bringing the synchronously moving element to rest, the continually rotating element will continue to move at the same rate as the synchronously moving element, thereby bridging over the gap during which there is no current supply.

A further object of my invention is the provision of certain mechanical details and features of construction necessary to provide an operative structure suitable to function in keeping with the above-mentioned objects.

The above and other objects of my invention will be apparent to those skilled in the art from a perusal of the accompanying specification and claims.

Referring now to the figures:

Fig. 3 is a detail of part of the mechanism for bringing the indicator at the central station into synchronism with the master clock.

Similar numerals of reference refer to like parts in all the figures.

Figure 1:
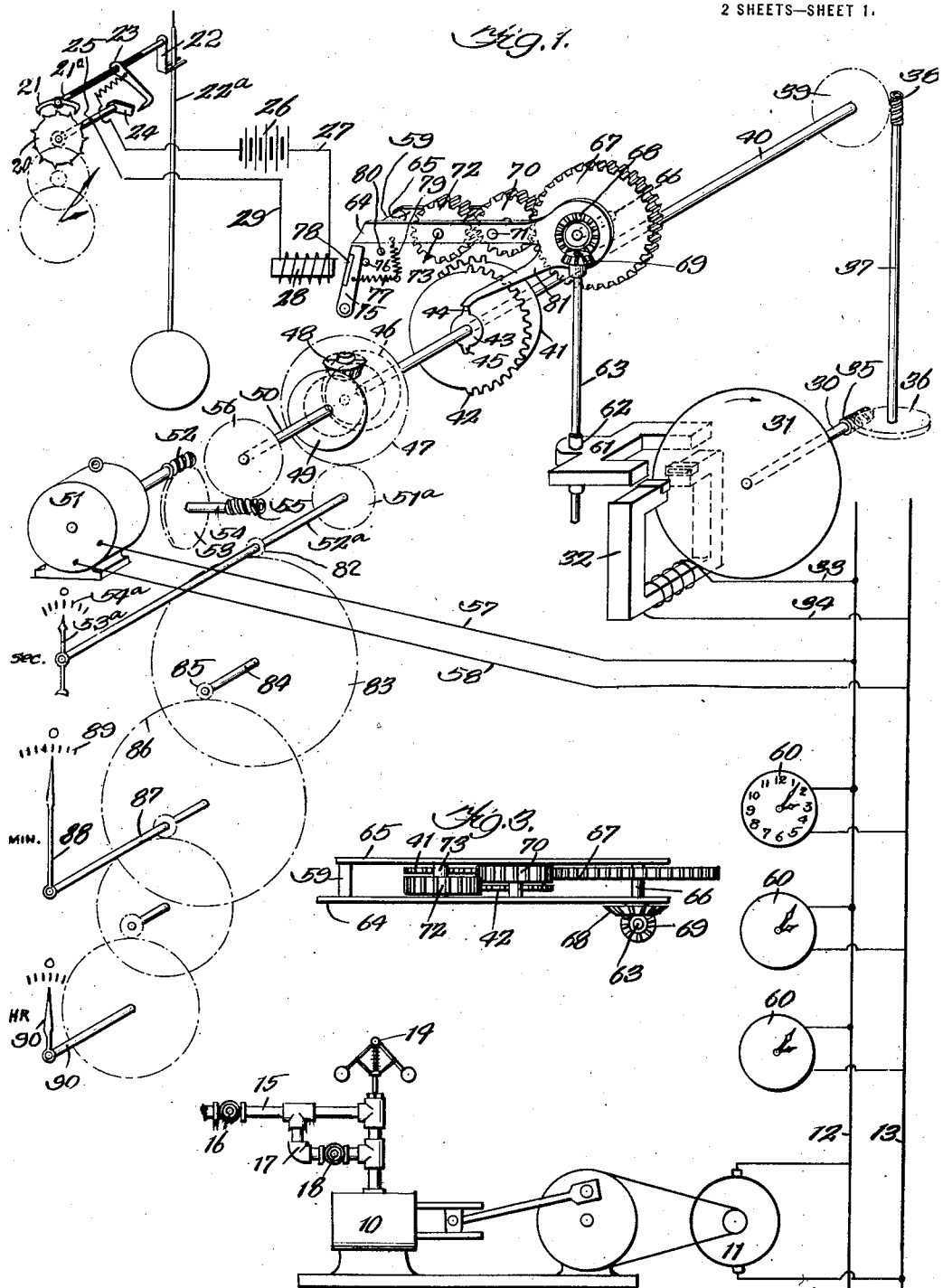
Figure 1 is a perspective diagrammatic view of the master clock and the central station apparatus.

Referring to Fig. 1, I have shown a prime mover 10, in the particular form of a reciprocating steam engine, although any prime mover, such as a steam or water driven turbine, may be used. Said prime mover drives a generator 11 of alternating current which supplies the line wires 12 and 13. The rate of rotation of the prime mover 10 is governed by the usual governor 14, supplied by a steam pipe 15. A throttle 16 serves to control the flow of steam through the pipe 15, and a by-pass is provided with an additional valve 18, by which steam may be admitted to the prime mover 10 independently of the governor 14. If the speed of the prime mover 10 is too slow the throttle 18 may be opened, thereby supplying the engine with steam independently of the action of the governor 14. In the event that the prime mover 10 is moving too fast, the throttle 16 may be manipulated, thus temporarily reducing the speed of the prime mover 10. It is one of the objects of my invention to synchronize the prime mover 10 with the master clock, to the end that the number of alternations sent out with the lines 12 and 13 shall average exactly sixty cycles per second in the long run. It is therefore necessary to provide some means of indicating the difference in time between the alternations sent out by the generator 11 and the master clock. To this end I have provided a master clock more or less diagrammatically shown at 19, and said clock is equipped with instrumentalities for the closing of an electric circuit at certain predetermined intervals, in the present instance once per minute. Owing to the vibration in the electric light station, it is undesirable to have the master clock located in said station, and I have therefore devised electric means to synchronize a rotating element with the currents sent out by the master clock. These means will presently be described.
Returning to the consideration of the master clock: Inspection of Fig. 1 will show that the clock contains the usual escape wheel 20 controlled by the pallets 21, which are mounted on an oscillatory shaft 21ª mounted on which is a fork or crutch 22 transmitting power to the pendulum 22ª. Mounted on the shaft 21ª and insulated from it is a contact arm 23, which is adapted to make contact with a coöperating contact arm 24 mounted on the shaft 25 of the escape wheel 20. The shaft 25 is arranged to revolve once each minute, and whenever the contact piece 24 is in a certain position the contact arm 23 will be brought into contact with the arm 24, and thus the circuit will be closed once each minute. The arm 23 is connected to one pole of the battery 26, the other pole of which is connected by a line wire 27 to an electromagnet 28 at the central station. The other terminal of the electromagnet 28 is connected by a line wire 29 to the escape-wheel shaft 25. Thus the electromagnet 28 will be energized once each minute by a momentary current sent over the line wires 27 and 29.

I will now describe the apparatus for keeping a rotating body at the central station in synchronism with the action of the magnet 28 and for indicating the excess or defect of the alternations sent out by the generator 11 from the correct number of sixty alternations per second. At the central station I have provided a rotating shaft 30, on which is mounted the aluminum disk 31, which is driven by the shaded poles of an alternating electromagnet 32 connected to the line wires 12 and 13 by the conductors 33 and 34. The electromgnet is so arranged that the aluminum disk 31 will rotate in the direction of the arrow. On the shaft 30 is a worm 35, meshing with a worm wheel 36 mounted on a shaft 37, on which is a worm 38 meshing in a worm wheel 39 mounted on a shaft 40. The gear ratio between the aluminum disk 31 and the shaft 40 is such that when the disk is running at its normal rate the shaft 40 revolves once each minute. Mounted on the shaft 40 is a mutilated gear 41 and a second mutilated gear 42, each of said gears having slightly more than half of their teeth cut away, as shown, and the gears 41 and 42 being so placed on the shaft 40 that the teeth of the gear 41 coincide with the blank space on the gear 42, and vice versa. Also mounted on the shaft 41 is a disk 43, having fingers 44 and 45.

Mounted on the shaft 40 is a bevel gear 46, forming one side of a differential gear whose center member 47 has a bevel gear 48 mounted therein, and the gear 48 meshes with a bevel 49 of the same size as the bevel 46 and mounted on a rotating shaft 50. The shaft 50 is driven by a synchronous motor 51, on the shaft of which is a worm 52 driving a gear 53 mounted on a shaft 54, on which is a worm 55 which drives a gear 56 on the shaft 50. The motor 51 is connected by conductors 57 and 58 to the line wires or bus bars 12 and 13. The direction of rotation of the synchronous motor 51 is such that the bevel gear 49 turns in the opposite direction from the bevel gear 46 and the gear ratio between the synchronous motor 51 and the bevel gear 49 is such that when the frequency of the alternating current is exactly sixty cycles per second the gear 49 revolves once per minute. From the gear arrangement just described it is obvious that if the bevel gear 46 revolves in one direction at the rate of one revolution per minute and the bevel gear 49 revolves in the opposite direction at the rate of one revolution per minute the central member 47 of the differential gear will remain immovable, but if the relative rates of rotation of the gear 46 and 49 should not be the same, then the central member 47 will be displaced an amount which is proportional to the difference.

For the purpose of clearly indicating the displacement of the central member 47, I have provided a gear 51ª mounted on a shaft 52ª, the gear 51 being half the diameter of the gear 47 and meshing therewith, and on the shaft 52ª I have provided a second hand 53ª revolving in front of a dial having suitable graduations 54ª. It is well known that in a differential gear having two side members of equal size, the central member is displaced half of the algebraic sum of the displacement of the two side members. Consequently if the gear 49 gets an entire revolution ahead or behind the gear 46, the second hand 53ª will turn through an entire revolution, since the gear 51ª is but half the diameter of the gear 47. Thus the second hand 53ª will indicate the departure of the rate of rotation of the synchronous motor 51, that is, the departure of the alternations on the system from the current frequency of sixty cycles per second. This, of course, assuming that the aluminum disk 31 is kept at a rate of rotation which is in synchronism with the impulses of the electromagnet 28. While means for directly indicating the deviation of the time is herein shown and described but not claimed, the same is claimed in divisional application, serial No. 305,099, filed June 18, 1919. I shall now describe how this latter result is accomplished:

The alternating magnet 32 is provided with a magnetic shunt 61, which is adapted to be approached or withdrawn from the poles of said magnet by a screw 62 on a shaft 63. Obviously, when the shunt 61 is moved closer to the magnet 32, said magnet will exercise a diminished torque on the aluminum disk 31, and the speed of said disk will accordingly diminish. On the contrary, if the shunt 61 is withdrawn from the poles of the magnet 32, said magnet will exert an increased torque on the disk 31, and said disk will be accordingly accelerated. In order to maintain the shunt 61 in its proper position, I have provided a rectangular framework consisting of a side piece 64, united by a pillar 59 to a side piece 65, said side pieces being rotatably mounted on a shaft 66, turning with which is a gear 67 held in its proper position between the side plates 54 and 65. The gear 67 has connected therewith a bevel gear 68, which meshes into a bevel 69 mounted on the shaft 63. The gear 67 is in mesh with a wide gear 70 rotatably mounted between the side plates 64 and 65 on the shaft 71, meshing in which gear is a second spur gear 72 similarly mounted on a shaft 73. The arrangement of the gears 70 and 72 is such that the gear 72 is adapted to mesh with the mutilated gear 42, but not with the mutilated gear 41. Similarly, the gear 70 is adapted to mesh with the mutilated gear 41, but not with the gear 42. Obviously, if the framework comprising the plates 64 and 65, which are united by the pillar 59, were allowed to drop into mesh with the rotating gears 41 and 42, rotation of said gears would first turn the gear 72 to actuate the gear wheel 67 in one direction by reason of its meshing with the teeth of the mutilated gears 42, and, after a vacant portion of said gear 42 had been reached, the gear 70 would be picked up by the teeth on the gear 41 and the gear wheel 67 turned an equal amount in the reverse direction. The gear arrangements between the gears 70 and 72 and the screw 62 are such that when the gear 70 is turned by the gear 41, the shunt 61 is withdrawn from the poles of the magnet 32, thereby accelerating the rate of the disk 31. When the gear 72 is turned by the teeth of the gear 42, the reverse is true, that is, the shunt 61 is moved nearer to the poles of the magnet 32, thereby retarding the motion of the disk 31. The plate 64 is engaged by a latch 75, which is held against the stop 76 by a spring 77, and said latch has attached to it an armature 78, which is adapted to be attracted by the electromagnet 28. The plate 64 is normally held by the latch in the position shown in Fig. 1, that is, in the position where neither of the gears 70 or 72 are in mesh with their coöperating mutilated gears 42 and 41. However, once each minute the magnet 28 attracts the magnet 78, and a spring 79 pulls the plate 64 and its associated framework into a position determined by a stop 80, and either the gear 72 or the gear 70 is engaged by its coöperating mutilated gear. The plate 64 is provided with an arm 81, which is adapted to be acted on by the fingers 44 and 45 on the disk 43. Accordingly, the plate 64 is lifted twice in each revolution of the shaft 40. The finger 44 may be taken as determining by its contact with the arm 81 the zero position of the shaft 40.

I shall now describe how the above mechanism coöperates to maintain the rotation of the disk 31 and connected shaft 40 in synchronism with the currents sent out from the master clock. Assume the parts in the position shown in Fig. 1, that is, the finger 44 in contact with the finger 81, and assume that a momentary current passes through the magnet 28. By hypothesis, since the zero position of the shaft 41 is determined by the contact of the finger 44 with the finger 81, the disk 31 is then in synchronism with the current from the master clock and no correction is necessary. Accordingly, the latch 75 will return to its original position, and when the finger 44 loses contact with the finger 81 the plate 64 will remain in its elevated position. It is to be noted that the fingers 44 and 45 are both of a length which will lift the plate 64 somewhat higher than its position when held by the latch 75. Assume, however, that when current is sent through the magnet 28 the finger 44 had not yet arrived into contact with the finger 81. This would correspond to a condition of the disk 31 revolving slower than the synchronous speed. When the latch 75 was withdrawn from contact with the plate 64, the framework would drop and would bring the gear 72 into mesh with the teeth of the gear 41, and this meshing would continue until the finger 81 was lifted by the finger 44. As before noted, when the gear 72 is turned by the gear 41, the magnetic shunt 61 is withdrawn from the poles of the magnet 32. Consequently, the rate of rotation of the disk 31 will be accelerated. At the next revolution of the shaft 40, if the finger 44 has not made contact with the finger 81 when current was sent through the magnet 28, this action would be repeated and the magnetic shunt 61 would be still further withdrawn from the poles of the magnet 32 by the action of the screws 62, and the disk would be still further accelerated. It is evident that this accelerating action would continue until the finger 44 had made contact with the finger 81 at the time when the current was sent through the magnet 28. Assume, on the other hand, that at the time current was sent through the magnet 28 the finger 44 was beyond its position of contact with the finger 81. In this event, the unlatching of the plate 64 would cause a mesh between the gear 42 and the gear 70, with the result that the shunt 61 would be approached to the poles of the magnet and the speed of the disk 31 would be consequently retarded. It is evident that this retarding action would continue until the finger 44 had been brought into registry with the finger 81 at the time the current was sent through the magnet 28, or, in other words, with the registry of the finger 44 the finger 81 would be brought into synchronism with the current sent out by the master clock 17. It is thus evident that the rate of rotation of the shaft 40, and consequently the rate of rotation of the attached gear 46, will be maintained in synchronism with currents sent out from the master clock 17. Since the shaft 40 is kept rotating in synchronism with the time of the master clock and the gear 49 is rotating in synchonism with the alternations of the generator, it is evident that the second hand 53$^a$ will indicate directly the departure between these two quantities. In other words, it will indicate the departure of the alternating current from its predetermined rate of sixty cycles per second. For the purpose of keeping track of errors greater than one minute, which would correspond to a complete revolution of the second hand 53$^a$, I have provided on the shaft 52$^a$ a pinion 82, into which meshes a gear 83 mounted on a shaft 84, on which is a pinion 85 engaging a gear 86 mounted on a shaft 87, on which is an indicating hand 88. The gear ratio between the shaft 52$^a$ and the shaft 87 is one to sixty. Consequently, the hand 88 will indicate the minutes, and suitable graduations 89 are provided to indicate the amount of deviation of the hand 88. In a similar manner I have provided an hour hand 90, mounted on the shaft 91, which is geared to the shaft 87 in a ratio of one to twenty-four, and said hand will indicate even revolution of the hand 88, although in practice this latter hand is probably superfluous.

Once every so often the attendant at the central station will glance at the dial in front of which are the hands 53, 88 and 90, and will note the amount of deviation of the current from the true time. He will then, by manipulating the speed of the prime mover through the valves 16 and 18, bring the hands back to their respective zero points. It is evident that the direction of displacement of the hands will denote whether the current is fast or slow, and the attendant will manipulate the valves 16 and 18 accordingly.

It will be recognized that the central station apparatus herein described is in some respects similar to that described by me in a certain co-pending application, in which there is a continuously rotating element at the central station kept in synchronism with impulses from a master clock. However, my herein described plan has some advantages in that there may be an occasional failure of the electric impulse sent out by the master clock 19 without effecting the synchronism of the rotating element. It is only in the event that the rotating element gets in error to the amount of a half a period that it will not be brought into synchronism. In my herein described arrangement it is evident that if the currents from the master clock cease, the rotating element is moving at approximately the proper rate, since it has been automatically regulated. It may, therefore, be trusted to run for some fifteen minutes without any current at all from the master clock. This charateristic does not obtain in the device described in my cited application.

It will be noted that when the disk 31 is corrected, in the event of its moving slower than the normal rate, that the correction is proportional to the error. On the other hand, if the disk 31 is corrected for moving at a faster rate, the correction is inversely proportional to the error. This characteristic will result in the moving element, in the event of its becoming fast, being at once regulated to run slow, then its speed will be increased until it again reaches a condition of synchronism. If it were worth while, it is of course possible to make the correction on the fast side proportional to the error. However, the error in any event will be small, since the synchronizing periods are only one minute long, and therefore refinement of this kind is not necessary.

Figure 2:
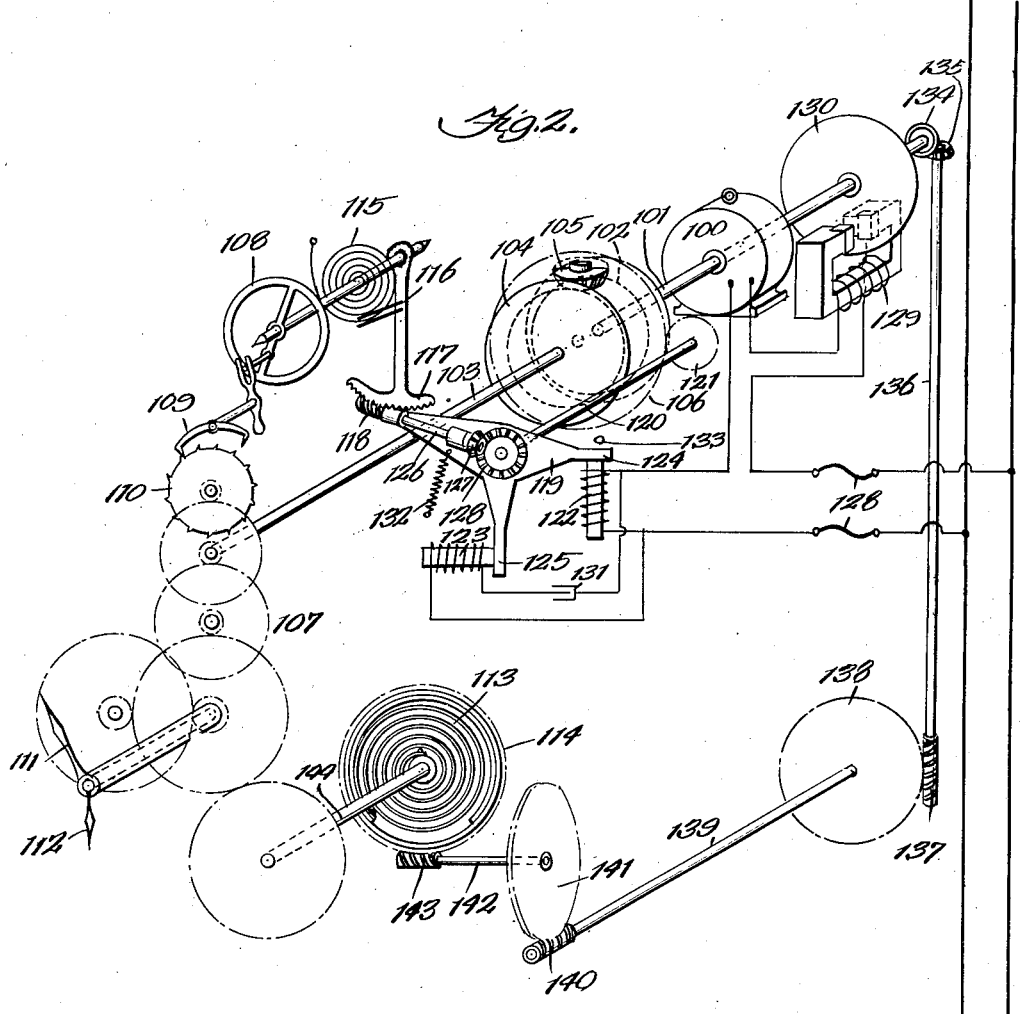
Fig. 2 is a perspective view, more or less diagrammatic, of the mechanism of the secondary clocks.
Figure 4:
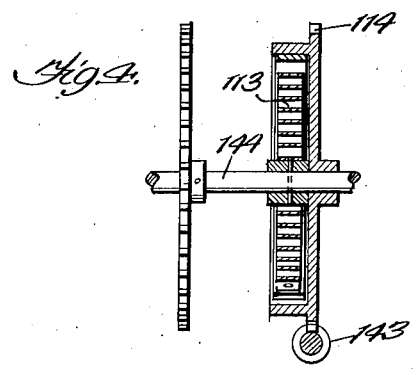
Fig. 4 is a section of the mainspring barrel of a secondary clock.

Having described the apparatus at the central station, I shall now describe the mechanism of my improved secondary clock. As above noted, the object of this clock is to provide a synchronously moving motor, which will keep in step with the current at the central station and provide some means of keeping the clock hands, whose motion is governed by said motor, from stopping in case there should be a temporary interruption of current. In Fig. 2, I have shown the mechanism of my secondary clock in a more or less diagrammatic form. It consists of a synchronous motor 100, a desirable form of which might be the motor described in the patent to Coerper, No. 527,195, October 9, 1894. The shaft 101 of the motor 100 is provided with a bevel gear 102 rigidly mounted thereon, and in line with said shaft is a shaft 103, on which is mounted a bevel 104 of the same size as the bevel 102. A bevel 105 is mounted in the center member 106 on the differential gear and serves to connect the gears 102 and 104. The shaft 103 is the second hand shaft of a clock movement, to which I have given the general number of 107. This movement 107 is provided preferably with a vibrating balance wheel 108, driven by a fork 109, which in its turn is driven by an escape wheel 110, connected by a customary train to the hour and minute hands 111 and 112. The motive power of the clock is given by a coil spring 113, which is frictionally mounted in a barrel 114, which is wound in a manner hereinafter to be described. The time of vibration of the balance wheel 108 is determined by a hair spring 115, which is controlled by a regulator 116. A gear segment 117 is on the regulator 116, and in said segment meshes a worm 118, which is mounted on a rocker 119 rotatably mounted on a shaft 120, having a gear 121 thereon which meshes with the gear 106 constituting the center member of the differential gear previously described. The worm 118 is held in mesh with the segment 117 by a pair of electromagnets 122 and 123, which attract their respective armatures 124 and 125, which are rigid to the rocker 119. Rotatably mounted in the rocker 119 is a shaft 126, on one end of which is a worm 118, and on the other end of which is a bevel gear 127. A bevel gear 128 on the shaft 120 meshes with the bevel gear 127 and serves to turn it.

Neglecting for a moment the electrical connections, assume that the synchronous motor 100 is running in step with the current sent over the line wires. The clock movement and the seconds hand shaft 103 is running at the same rate as the shaft 101, running faster than said shaft or slower than said shaft. If the two shafts 101 and 103 are running at the same rate, it is evident that the central member 106 of the differential gear will remain immovable and that the gear 121 and its connected worm 118 will remain immovable also. However, assume that the shaft 103 is running slower than the shaft 101. This will correspond to the condition of the clock movement 117 running slower than the synchronous motor 100. In this event the center member 106 will be displaced and the worm 118 will turn in a direction to shorten the effective length of the hair spring 116, and this movement will continue until the fact of the center member 106 of the differential gear becoming immovable will stop the action of the worm 118. The clock 107 is then running at the same rate as the motor 100. It is not needful to explain how the clock will be corrected in case it is running faster than the synchronous motor 100, since this action is the reverse of the action previously described. It is evident that, with the mechanism just described, the clock 107 will be regulated until it is running at the same rate as the synchronous motor 100.

I shall now describe the current connections: Connected to the line wires 12 and 13 through the fuse plug 128 are the shaded pole electromagnet 129 driving an aluminum disk 130 for a purpose hereinafter to be described, the synchronous motor 100 and the magnet 122. In shunt around the magnet 122 is the condenser 131 in series with the magnet 123, the object being to split the phase of the alternating current and thus avoid the chattering of the rocker 119. If the current source is cut off, the electromagnets 122 and 123 will of course release their armatures, and a spring 132 connected to the plate 119 will pull said plate into a position determined by the contact of the armature 124 with a stop 133. While in this condition, the worm 118 is out of mesh with the segment 117. The regulator 116 is of course rotatably mounted concentric with the shaft of the balance wheel 108, and is held frictionally so that it will remain in any position in which it may be placed, this construction being usual in the regulators of clocks.

From the preceding it is apparent that if the current is at any time cut off the clock 107 will continue to rotate at the same rate as the synchronous motor 100 was running when the current was cut off, since said clock has been automatically regulated to rotate at this rate by the action of the differential gears connected to the shafts 103 and 101. It is also evident that while the center member of the differential gear 106 will turn during the period or no current, the regulator 116 will not be moved thereby, since during this period the gear 118 will be out of mesh with the segment 117. When the current is resumed, the gear 118 will be returned into mesh, the shaded pole magnet 129 will act on the aluminum disk 130, said disk being mounted on the shaft 101, and thus will give an initial start to the synchronous motor, which will come promptly into step. While it is true that there will be a continuous torque on the disk 130 during the period when said current is on, yet said torque is not made strong enough to pull the synchronous motor 100 out of step, but rather assists said motor. In fact, the main torque of the system is supplied by the disk 130, the motor 100 serving largely to keep the rotation of said disk in step with the current.

I have further provided means for keeping the clock 107 wound during the time current is on the line wires 12 and 13. Reference to Fig. 2 will disclose that I have provided a bevel gear 134 on the shaft 101, and in said bevel is meshed a bevel 135, mounted on a shaft 136, carrying a worm 137 driving the wheel 138 mounted on a shaft 139, on which is a worm 140 driving a wheel 141 mounted on a shaft 142 carrying a worm 143 meshing in the teeth cut in the barrel 114. The inner end of the spring 113 is fastened to the shaft 144, which serves to drive the clock train, and the other end of said spring is frictionally held in the barrel 114. The gear ratio between the shaft 101 and the barrel 114 is such that said barrel is turned a complete revolution in about three-quarters of an hour. The shaft 144 is so geared to the clock train that it makes one revolution in an hour. Consequently, the barrel 114 is always being overwound, but since the spring 113 is only in frictional engagement therewith, said spring will slip to make up for the excess motion of the barrel 114.

I have shown various secondary clocks 60 connected to the line wires 12 and 13. It is understood that these clocks are to be of the same construction as the clock shown in Fig. 2, although it is evident that clocks consisting simply of a synchronous motor like those described in my cited application may be used.

It is obvious that the herein described secondary clock is equally well adapted to be used with the system described in my cited application, and has the advantage over the secondary clocks therein described in that my herein described clock will not stop if the current is temporarily cut off.

Many changes and modifications may be made in my herein described structure without departing from the spirit of my invention, since I claim:

1. The combination with a spring-actuated member, of a source of commercial alternating-current, means actuated in synchronism with the alternating current, and means whereby the spring-actuated member is caused to operate in synchronism with the said synchronously actuated means.

2. In a clock system, the combination of a central station, an alternating generator located at such station, line wires extending from said station to a series of subscribers' stations, and secondary clocks located at said subscribers' stations and connected to said line wires, said secondary clocks including a continuously moving element and an element moving in synchronism with the current sent from said central station, and means to bring said continuously moving element and said synchronously moving element into synchronism with each other.

3. In a clock system, the combination of a continuously moving element, a source of alternating current supply, a synchronously moving element moving in step with said current, and means connecting said synchronously moving element and said continuously moving element to bring them into synchronism with each other.

4. In a clock system, the combination of a continuously moving element, a source of alternating current supply, a synchronously moving element moving in step with said current, and automatic means connecting said synchronously moving element and said continuously moving element to bring them into synchronism with each other.

5. In a clock system, the combination of a source of current supply, an element moving in synchronism with said source of current supply, a second moving element, means to regulate the speed of said second moving element, and means governed by said synchronously moving element to control said speed-regulating means, whereby the second moving element is brought into synchronism with the synchronously moving element.

6. In a clock system, a source of current supply, a synchronous motor running in step with said source of current supply, a second moving element, a spring to drive said second moving element, a connection between said synchronous motor and said spring whereby the former winds the latter, and means governed by said synchronous motor to control the speed of the second moving element.

7. In a clock system, the combination of a source of current supply, a synchronous motor driven thereby, a second moving element, a spring to drive said second moving element, means to synchronize said second moving element with said synchronous motor, and means to wind said spring also connected to said synchronous motor.

8. In a clock system, the combination of a source of current supply, a synchronous motor driven thereby, a second moving element, a spring to drive said second moving element, automatic means to synchronize said second moving element with said synchronous motor, and means to wind said spring also connected to said synchronous motor.

9. The combination with an alternating-current source of supply and a synchronous motor operatively connected thereto, of spring-actuated clock hands, and means to synchronize said clock hands with the synchronous motor.

10. The combination with an alternating-current source of supply and a synchronous motor operatively connected thereto, of spring-actuated clock hands, means for synchronizing said clock hands with the synchronous motor, and means whereby the synchronous motor winds the spring.

11. In a clock system, the combination of a central station, an alternating current generator located at said station, said alternating generator being capable of supplying current to furnish both light and power to subscribers' stations, line wires extending from said central station to a series of subscribers' stations, and secondary clocks located on said subscribers' stations and connected to said line wires, said secondary clocks including a continuously moving element and an element moving in synchronism with the current sent from said central station, and means to bring said moving element and said synchronous moving element into synchronism with each other.

12. The combination with an alternating-current source of supply and a synchronous motor operatively connected thereto, of a spring-actuated clock, means connected between the motor and the clock for so controlling the clock that it runs in synchronism with the motor, and means actuated by the motor for winding the clock spring.

In witness whereof I have hereunto signed my name this 8th day of Sept., 1917.

ARTHUR F. POOLE.